US012754459B2

(12) United States Patent
Griggs

(10) Patent No.: US 12,754,459 B2
(45) Date of Patent: Oct. 6, 2026

(54) IMAGE CAPTURE SYSTEMS FOR USE IN LAND AND UNDERWATER ENVIRONMENTS

(71) Applicant: GoPro, Inc., San Mateo, CA (US)

(72) Inventor: Ian Copeland Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 170 days.

(21) Appl. No.: 18/741,229

(22) Filed: Jun. 12, 2024

(65) Prior Publication Data

US 2025/0028227 A1 Jan. 23, 2025

Related U.S. Application Data

(60) Provisional application No. 63/527,211, filed on Jul. 17, 2023.

(51) Int. Cl.

*G03B 17/08* (2021.01)
*G03B 17/14* (2021.01)
*H04N 23/51* (2023.01)
*H04N 23/55* (2023.01)

(52) U.S. Cl.

CPC ............. *G03B 17/08* (2013.01); *G03B 17/14* (2013.01); *H04N 23/51* (2023.01); *H04N 23/55* (2023.01)

(58) Field of Classification Search

CPC ........ G03B 17/08; G03B 17/14; G02B 13/06; H04N 23/51; H04N 23/55

See application file for complete search history.

(56) References Cited

U.S. PATENT DOCUMENTS

| | | | |
|---|---|---|---|
| 751,347 | A | 2/1904 | Scheimpflug |
| 3,760,704 | A | 9/1973 | Baker |
| 3,818,498 | A | 6/1974 | Zehnpfennig |
| 4,109,263 | A | 8/1978 | Johnson |
| 4,119,980 | A | 10/1978 | Baker |
| 4,422,740 | A | 12/1983 | Tohru |

(Continued)

FOREIGN PATENT DOCUMENTS

| | | | | |
|---|---|---|---|---|
| CN | 111308835 A | * 6/2020 | ............. | G03B 17/08 |
| CN | 220064578 U | * 11/2023 | | |
| WO | WO-2024250302 A1 | * 12/2024 | ............ | H04N 5/222 |

OTHER PUBLICATIONS

KNEKT, http://www.knektusa.com/video/, KNEKT KSD6 6" Dome Port : How to Clean Replace Dome (product maintenance guide video), video N PL, relevant video at 2:50-3:10; product maintenance guide (Year: 2014/2015) 1 page.

(Continued)

*Primary Examiner* — Christopher E Mahoney
(74) *Attorney, Agent, or Firm* — Young Basile Hanlon & MacFarlane. P.C.

(57) ABSTRACT

An image capture system that includes an image capture apparatus and at least one optical accessory. The image capture apparatus includes a body and at least one lens that is supported by the body so as to define a field-of-view for the image capture apparatus. The at least one optical accessory is configured to overlie the at least one lens and thereby shift the field-of-view outwardly away from the image capture apparatus so as to define at least one blind area that is configured such that the field-of-view is spaced from the body of the image capture apparatus.

20 Claims, 8 Drawing Sheets

(56) References Cited

U.S. PATENT DOCUMENTS

| | | | | |
|---|---|---|---|---|
| 4,634,253 | A | 1/1987 | Tamamura | |
| 4,860,038 | A | 8/1989 | Thatcher | |
| 5,721,585 | A | 2/1998 | Keast | |
| D467,259 | S | 12/2002 | Hung | |
| 6,726,331 | B2 | 4/2004 | Miyata | |
| 7,495,843 | B2 | 2/2009 | Ge | |
| 8,149,327 | B2 | 4/2012 | Lin | |
| 8,369,034 | B2 | 2/2013 | Aiba | |
| 8,902,318 | B1 | 12/2014 | Haddad | |
| 9,185,279 | B2 | 11/2015 | Masuda | |
| 9,456,113 | B2 | 9/2016 | Masuda | |
| 9,607,358 | B2 | 3/2017 | Takenaka | |
| 9,686,468 | B2 * | 6/2017 | Eromäki | H04N 23/667 |
| 9,736,372 | B2 | 8/2017 | Masuda | |
| 9,933,816 | B2 | 4/2018 | Ranetkins | |
| 9,992,414 | B2 | 6/2018 | Masuda | |
| 10,146,050 | B1 * | 12/2018 | Remijan | H04N 23/51 |
| 10,382,681 | B2 | 8/2019 | Masuda | |
| 10,404,912 | B2 | 9/2019 | Ogawa | |
| 10,536,615 | B2 | 1/2020 | Campbell | |
| 10,652,458 | B2 | 5/2020 | Kang | |
| 10,666,360 | B2 | 5/2020 | Saathoff | |
| 10,666,860 | B2 | 5/2020 | Takenaka | |
| 10,747,090 | B2 | 8/2020 | Campbell | |
| 10,855,919 | B2 | 12/2020 | Masuda | |
| 10,855,979 | B2 | 12/2020 | Pace | |
| 10,901,300 | B2 | 1/2021 | Campbell | |
| 2002/0057337 | A1 | 5/2002 | Kumler | |
| 2007/0002131 | A1 | 1/2007 | Ritchey | |
| 2007/0062905 | A1 | 3/2007 | Hung | |
| 2009/0040291 | A1 | 2/2009 | McCall | |
| 2010/0045773 | A1 | 2/2010 | Ritchey | |
| 2012/0023177 | A1 | 1/2012 | Linden | |
| 2014/0192144 | A1 | 7/2014 | St. Clair | |
| 2014/0218587 | A1 | 8/2014 | Shah | |
| 2015/0370150 | A1 | 12/2015 | O'Neill | |
| 2016/0261829 | A1 | 9/2016 | Olsson | |
| 2017/0054907 | A1 | 2/2017 | Nishihara | |
| 2017/0059805 | A1 | 3/2017 | Ranetkins | |
| 2017/0139309 | A1 | 5/2017 | Axelsson | |
| 2018/0020160 | A1 | 1/2018 | Lin | |
| 2018/0039163 | A1 | 2/2018 | Halsey | |
| 2018/0045910 | A1 | 2/2018 | Oneill | |
| 2018/0143512 | A1 | 5/2018 | Campbell | |
| 2018/0143514 | A1 | 5/2018 | Campbell | |
| 2018/0146122 | A1 | 5/2018 | Campbell | |
| 2018/0152637 | A1 | 5/2018 | Tolman | |
| 2019/0113826 | A1 | 4/2019 | Nam | |
| 2020/0133095 | A1 * | 4/2020 | Cotoros | G02B 7/021 |
| 2020/0218136 | A1 * | 7/2020 | Au | H04N 23/51 |

OTHER PUBLICATIONS

Randall Hand, "Immersive Media's Dodeca 2360 Spherical Video Camera", VizWorld, Nov. 12, 2025, 4 pages.

The Magazine of Panoramic Imaging, Jun.-Jul. 1996, vol. 13, No. 3, 20 pages.

The Magazine of Panoramic Imaging, Mar.-Apr. 1996, vol. 13, No. 2, 20 pages.

* cited by examiner

FIG. 5
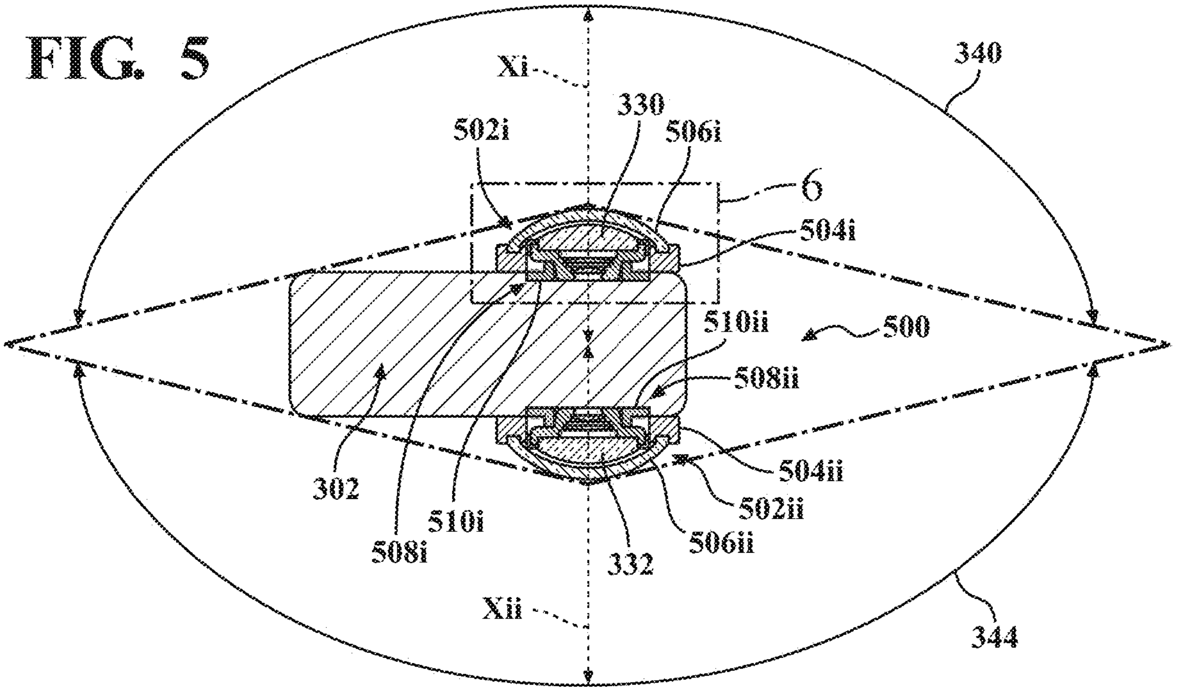
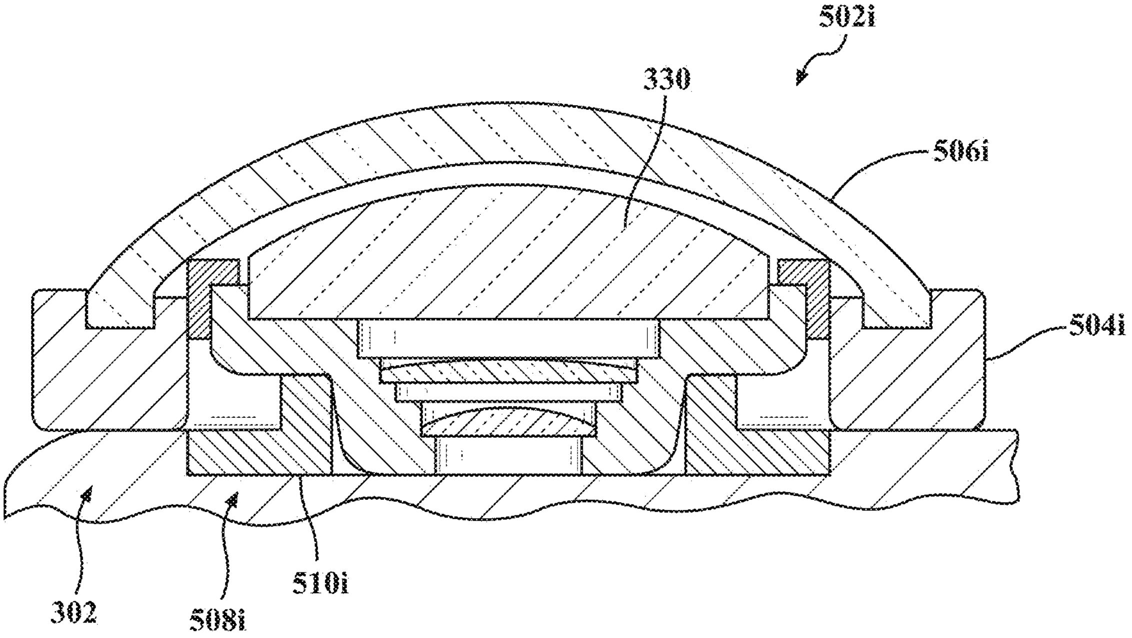
FIG. 6

IMAGE CAPTURE SYSTEMS FOR USE IN LAND AND UNDERWATER ENVIRONMENTS

CROSS-REFERENCE TO RELATED APPLICATION(S)

This application claims the benefit of and priority to U.S. Provisional Patent Application No. 63/527,211, filed on Jul. 17, 2023, the entire contents of which are hereby incorporated by reference.

TECHNICAL FIELD

The present disclosure relates to various optical accessories, housings, and image capture systems that facilitate the use of an image capture apparatus in land and underwater environments.

BACKGROUND

Image capture apparatuses are used in a variety of applications (e.g., handheld cameras and video recorders, cell phones, drones, vehicles, etc.) and include one or more lenses (or other such optical elements) and one or more image sensors. The lens(es) capture content by receiving and focusing light, and the image sensor(s) convert the captured content into an electronic image signal that is processed by an image signal processor to generate an image. In some image capture apparatuses, the lens(es) and the image sensor(s) are integrated into a single unit, which is known as an ISLA.

Omnidirectional image capture apparatuses typically include a pair of ISLAs that are oriented in opposite (e.g., front and rear) directions. The ISLAs define fields-of-view that overlap at stitch points, which allows the images captured by the ISLAs to be combined into a single, 360 degree spherical image during image processing. When used with a housing (e.g., a protective sleeve, an underwater (dive) housing, etc.), however, the housing may be inadvertently included in the captured content and/or reduce the image quality. As a countermeasure, the image capture apparatus may be configured to (artificially) increase the spacing between the lenses and the stitch points in an effort to eliminate the housing from the captured content, which can result in reduced image quality due to pixel sacrifice, loss of resolution, etc.

An opportunity thus remains for improvements in content capture, image processing, and output. The present disclosure addresses this opportunity and describes various optical accessories, housings, and image capture systems that are configured to shift the field-of-view of an image capture apparatus in order to limit (if not entirely eliminate) extraneous content (e.g., the housing) from the generated image.

SUMMARY

In one aspect of the present disclosure, an image capture system is disclosed that includes an image capture apparatus and at least one optical accessory. The image capture apparatus includes a body and at least one lens that is supported by the body. The at least one optical accessory is configured to overlie the at least one lens and thereby shift a field-of-view of the image capture apparatus outwardly away from the body so as to define at least one blind area that is configured such that the field-of-view is spaced from the body of the image capture apparatus.

In certain embodiments, it is envisioned that the at least one optical accessory may be configured such that the field-of-view is spaced from the body of the image capture apparatus by a distance that lies (substantially) within the range of (approximately) ½ mm to (approximately) 5 mm.

In certain embodiments, the at least one optical accessory may include a single lens.

In certain embodiments, the image capture apparatus may further include a mounting structure that is connected to the body.

In certain embodiments, the at least one optical accessory may be configured for direct connection to the mounting structure.

In certain embodiments, the at least one optical accessory may be configured for use in an environment defining an index of refraction that lies (substantially) within the range of (approximately) 1.0 to (approximately) 1.1.

In certain embodiments, the image capture system may further include a sleeve that is configured to receive the image capture apparatus such that the sleeve is located within the at least one blind area.

In certain embodiments, the at least one optical accessory may be configured for use in an environment defining an index of refraction that lies (substantially) within the range of (approximately) 1.3 to (approximately) 1.5.

In certain embodiments, the image capture system may further include an underwater housing that is configured to receive the image capture apparatus such that the underwater housing is located within the at least one blind area.

In certain embodiments, the at least one optical accessory may be configured for removable connection to the underwater housing.

In certain embodiments, the at least one optical accessory may be formed integrally with the underwater housing such that the underwater housing and the at least one optical accessory are non-removably connected.

In another aspect of the present disclosure, an image capture system is disclosed that includes: an image capture apparatus; at least one first optical accessory that includes first optical properties; and at least one second optical accessory that includes second optical properties, which are different than the first optical properties. The image capture apparatus includes a body and at least one lens that is supported by the body. The at least one first optical accessory and the at least one second optical accessory are each configured to overlie the at least one lens and thereby shift a field-of-view of the image capture apparatus outwardly away from the body such that the field-of-view is spaced from the body by a distance that lies (substantially) within the range of (approximately) ½ mm to (approximately) 5 mm.

In certain embodiments, the at least one first optical accessory may be configured for use in an environment defining an index of refraction that lies (substantially) within the range of (approximately) 1.0 to (approximately) 1.1.

In certain embodiments, the image capture system may further include a sleeve that is configured to receive the image capture apparatus such that the sleeve is located outside of the field-of-view.

In certain embodiments, the at least one second optical accessory may be configured for use in an environment defining an index of refraction that lies (substantially) within the range of (approximately) 1.3 to (approximately) 1.5.

In certain embodiments, the image capture system may further include an underwater housing that is configured to receive the image capture apparatus such that the underwater housing is located outside of the field-of-view.

In another aspect of the present disclosure, an underwater image capture system is disclosed for use with an image capture apparatus that defines an optical axis. The underwater image capture system includes an underwater housing that is configured to receive the image capture apparatus and an at least one optical accessory. The at least one optical accessory is configured to shift a field-of-view of the image capture apparatus outwardly along the optical axis so as to define at least one blind area that is configured to receive the underwater housing so as to inhibit detection of the at least one blind area and the underwater housing by at least one image sensor of the image capture apparatus when the image capture apparatus is positioned within the underwater housing.

In certain embodiments, the at least one optical accessory may be configured for use in an environment defining an index of refraction that lies (substantially) within the range of (approximately) 1.3 to (approximately) 1.5.

In certain embodiments, the at least one optical accessory may be formed integrally with the underwater housing such that the at least one optical accessory and the underwater housing are non-removably connected.

In certain embodiments, the at least one optical accessory may be configured for removable connection to the underwater housing.

In certain embodiments, the underwater housing may include a non-reflective section to inhibit stray light from entering the image capture apparatus.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings in the interest of clarity.

FIG. 5 is an axial (longitudinal) cross-sectional view of another example of an image capture apparatus, which includes a pair of optical accessories.

FIG. 6 is an enlargement of the area of detail identified in FIG. 5.

DETAILED DESCRIPTION

The present disclosure describes various optical accessories, housings, and image capture systems that facilitate the use of an image capture apparatus in both land and underwater environments. More specifically, the optical accessories described herein shift the field-of-view of the image capture apparatus outwardly such that, upon assembly of the housing and the image capture apparatus, the housing lies outside the field-of-view (e.g., within a blind area), which inhibits (if not entirely prevents) inclusion of the housing in the image generated by the image capture apparatus.

Figure 1A:
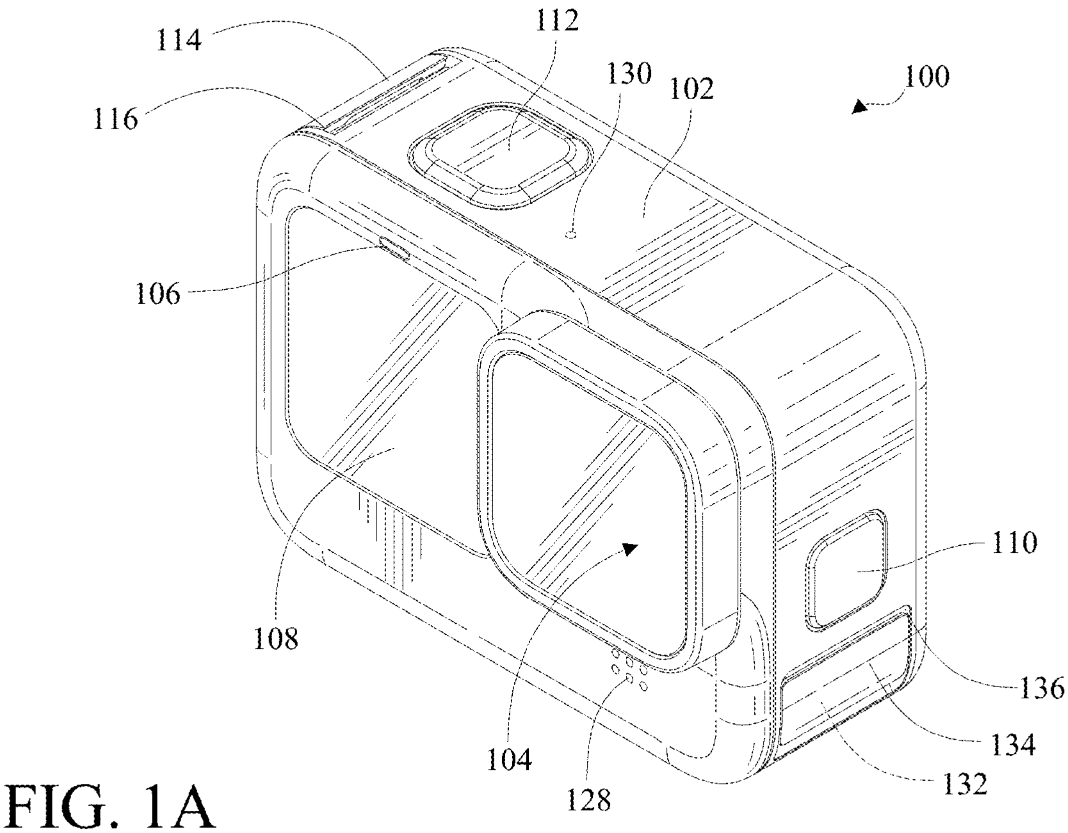
FIGS. 1A-B are isometric views of an example of an image capture apparatus.
Figure 1B:
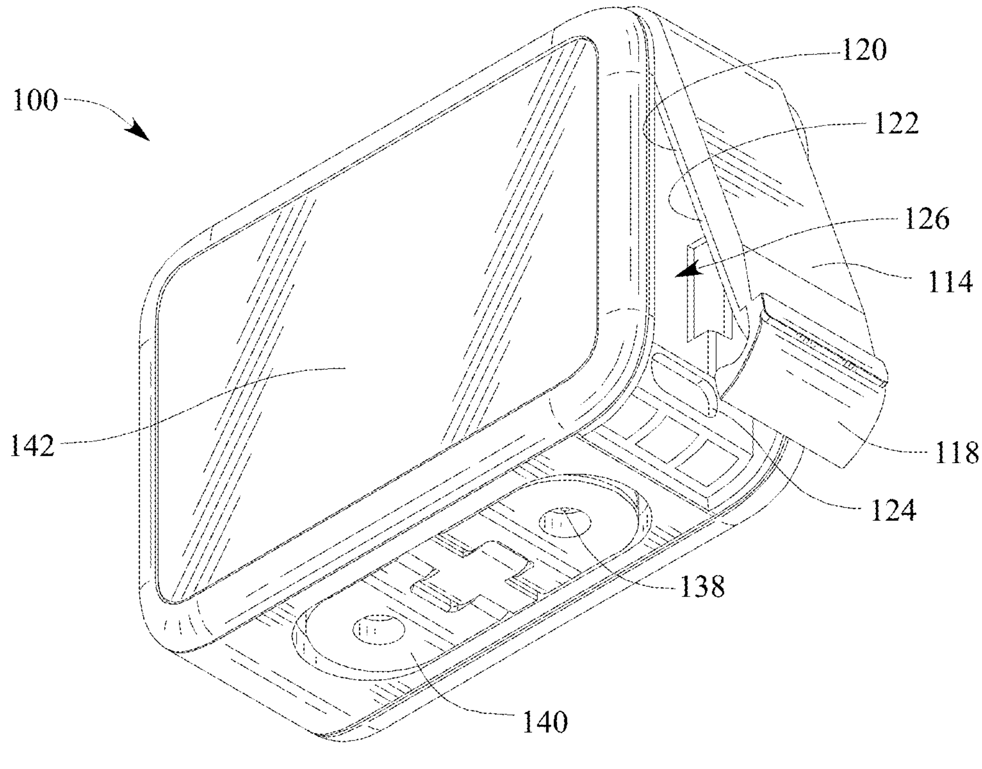

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured (connected) to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
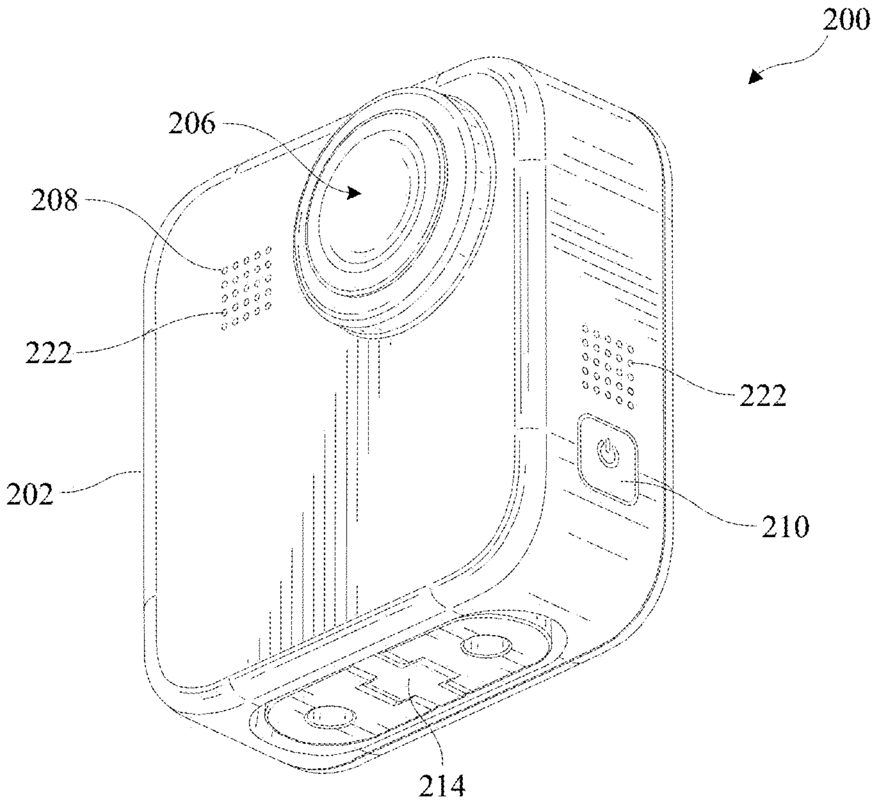
FIGS. 2A-B are isometric views of another example of an image capture apparatus.
Figure 2B:
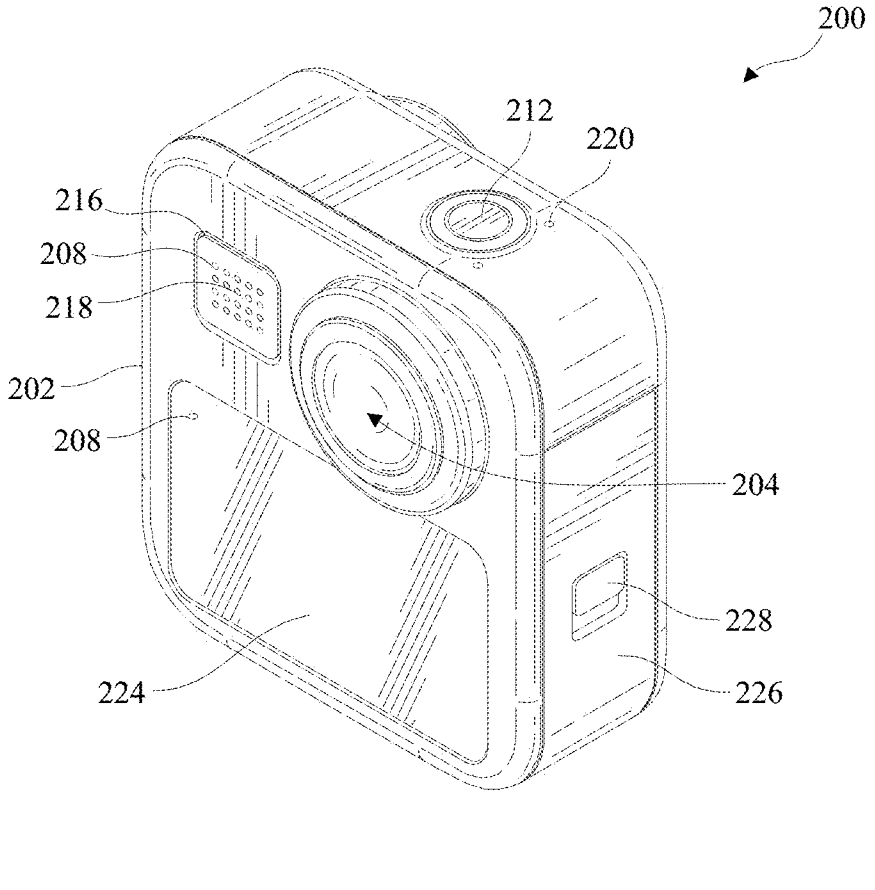

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

Figure 4:
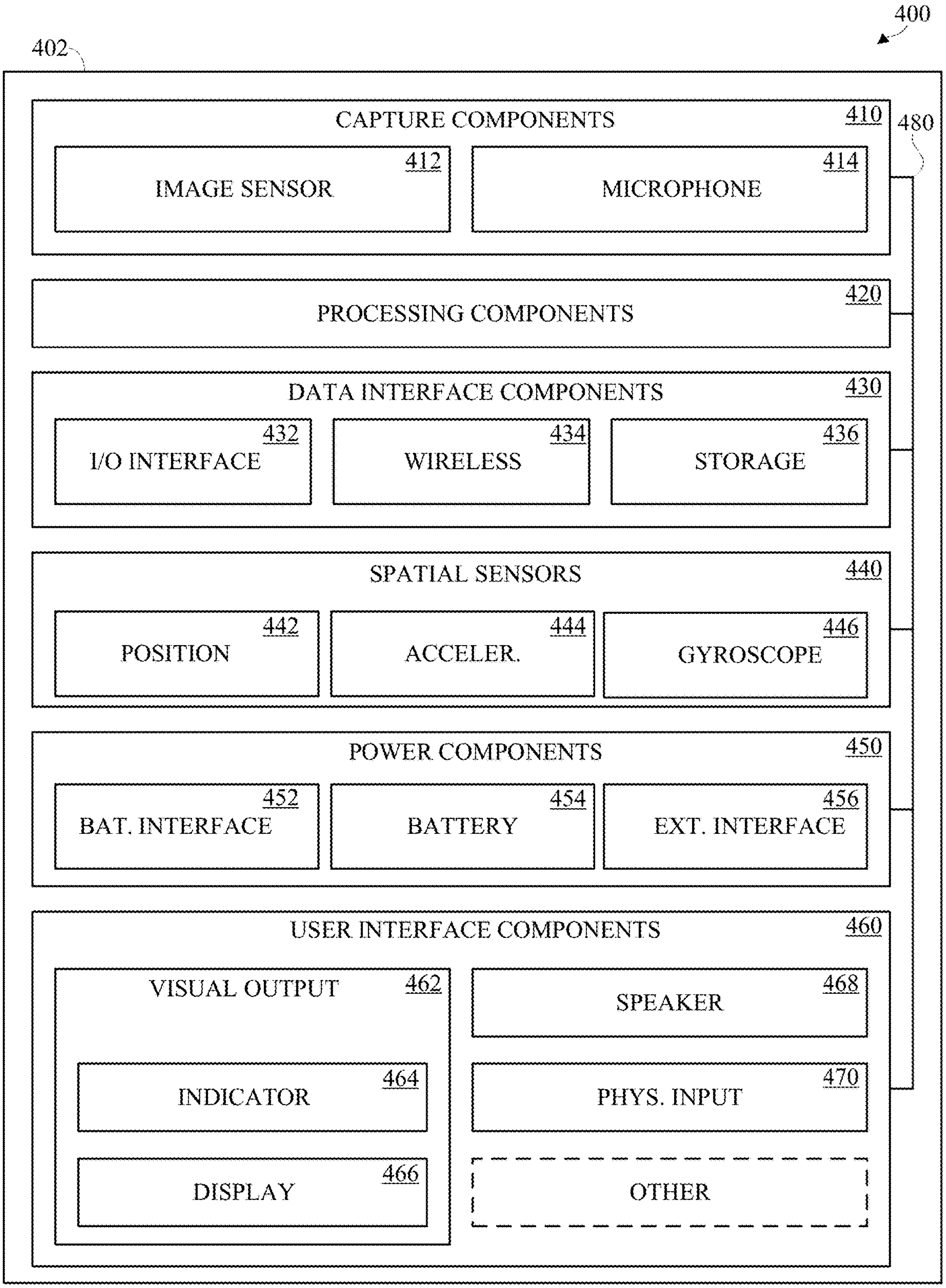
FIG. 4 is a block diagram of electronic components of an image capture apparatus.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 4.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
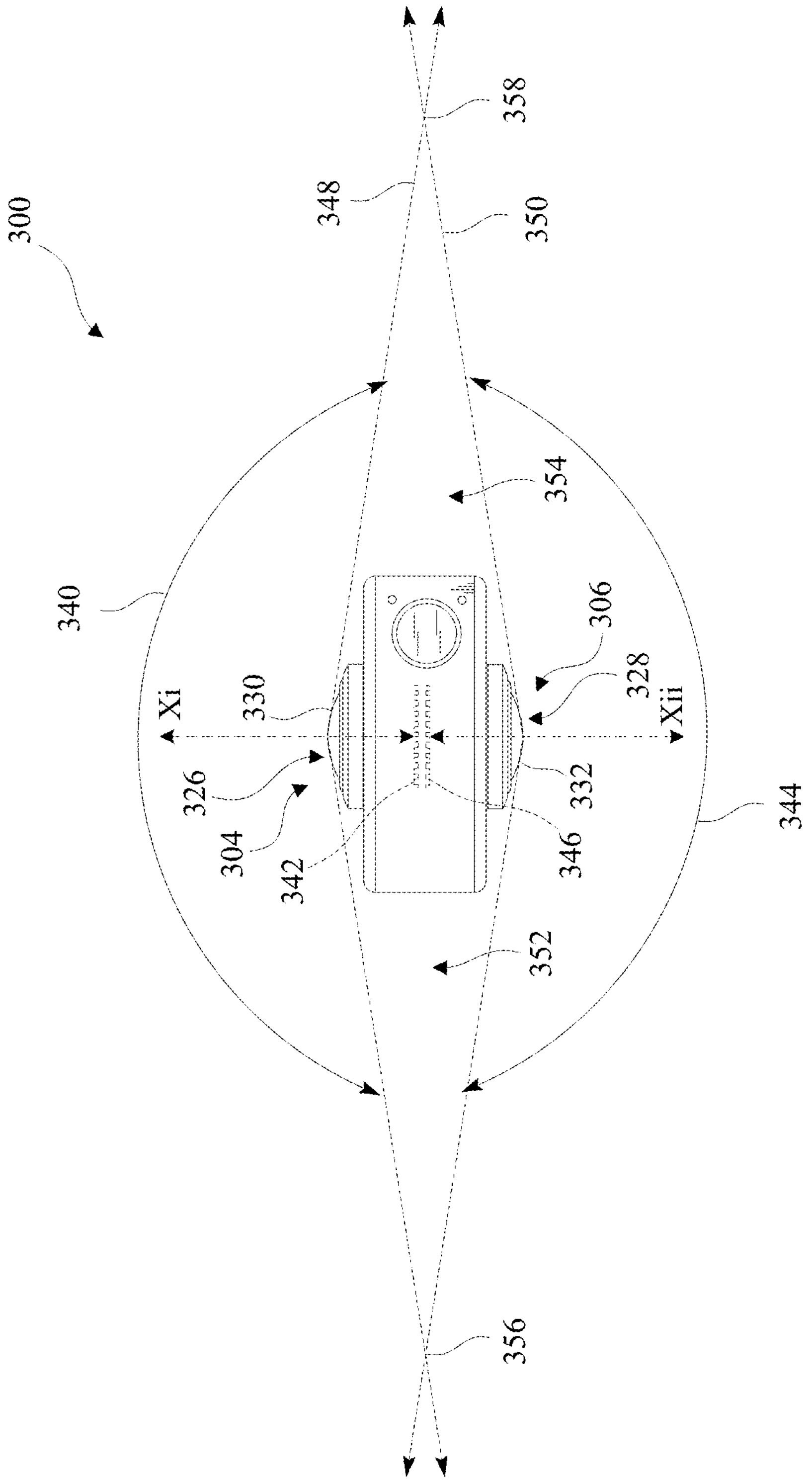
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342. In the illustrated embodiment, the first lens 330 and the first image sensor 342 are integrated into a single unit, whereby the first image capture device 304 is configured as a first ISLA 326 that defines a first optical axis Xi.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346. In the illustrated embodiment, the second lens 332 and the second image sensor 346 are integrated into a single unit, whereby the second image capture device 306 is configured as a second ISLA 328 that defines a second optical axis Xii.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions (e.g., a forward direction and a rearward direction), and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The ISLAs 326, 328 (e.g., the lenses 330, 332) may be aligned as shown (e.g., such that the optical axes Xi, Xii are coincident with each other), laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

FIG. 4 is a block diagram of electronic components in an image capture apparatus 400. The image capture apparatus 400 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, or the image capture apparatus 300 shown in FIG. 3, may be implemented as shown in FIG. 4.

The image capture apparatus 400 includes a body 402. The body 402 may be similar to the body 102 shown in FIGS. 1A-1B or the body 202 shown in FIGS. 2A-2B. The body 402 includes electronic components such as capture components 410, processing components 420, data interface components 430, spatial sensors 440, power components 450, user interface components 460, and a bus 480.

The capture components 410 include an image sensor 412 for capturing images. Although one image sensor 412 is shown in FIG. 4, the capture components 410 may include multiple image sensors. The image sensor 412 may be similar to the image sensors 342, 346 shown in FIG. 3. The image sensor 412 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 412 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 412 captures detected light as image data and conveys the captured image data as electrical signals (image signals or image data) to the other components of the image capture apparatus 400, such as to the processing components 420, such as via the bus 480.

The capture components 410 include a microphone 414 for capturing audio. Although one microphone 414 is shown in FIG. 4, the capture components 410 may include multiple microphones. The microphone 414 detects and captures, or records, sound, such as sound waves incident upon the microphone 414. The microphone 414 may detect, capture, or record sound in conjunction with capturing images by the image sensor 412. The microphone 414 may detect sound to receive audible commands to control the image capture apparatus 400. The microphone 414 may be similar to the microphones 128, 130, 132 shown in FIGS. 1A-1B or the audio components 218, 220, 222 shown in FIGS. 2A-2B.

The processing components 420 perform image signal processing, such as filtering, tone mapping, or stitching, to generate, or obtain, processed images, or processed image data, based on image data obtained from the image sensor 412. The processing components 420 may include one or more processors having single or multiple processing cores. In some implementations, the processing components 420 may include, or may be, an application specific integrated circuit (ASIC) or a digital signal processor (DSP). For example, the processing components 420 may include a custom image signal processor. The processing components 420 conveys data, such as processed image data, with other components of the image capture apparatus 400 via the bus 480. In some implementations, the processing components 420 may include an encoder, such as an image or video encoder that may encode, decode, or both, the image data, such as for compression coding, transcoding, or a combination thereof.

Although not shown expressly in FIG. 4, the processing components 420 may include memory, such as a random-access memory (RAM) device, which may be non-transitory computer-readable memory. The memory of the processing components 420 may include executable instructions and data that can be accessed by the processing components 420.

The data interface components 430 communicates with other, such as external, electronic devices, such as a remote control, a smartphone, a tablet computer, a laptop computer, a desktop computer, or an external computer storage device. For example, the data interface components 430 may receive commands to operate the image capture apparatus 400. In another example, the data interface components 430 may transmit image data to transfer the image data to other electronic devices. The data interface components 430 may be configured for wired communication, wireless communication, or both. As shown, the data interface components 430 include an I/O interface 432, a wireless data interface 434, and a storage interface 436. In some implementations, one or more of the I/O interface 432, the wireless data interface 434, or the storage interface 436 may be omitted or combined.

The I/O interface 432 may send, receive, or both, wired electronic communications signals. For example, the I/O interface 432 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 432 is shown in FIG. 4, the data interface components 430 include multiple I/O interfaces. The I/O interface 432 may be similar to the data interface 124 shown in FIG. 1B.

The wireless data interface 434 may send, receive, or both, wireless electronic communications signals. The wireless data interface 434 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 434 is shown in FIG. 4, the data interface components 430 include multiple wireless data interfaces. The wireless data interface 434 may be similar to the data interface 124 shown in FIG. 1B.

The storage interface 436 may include a memory card connector, such as a memory card receptacle, configured to receive and operatively couple to a removable storage device, such as a memory card, and to transfer, such as read, write, or both, data between the image capture apparatus 400 and the memory card, such as for storing images, recorded audio, or both captured by the image capture apparatus 400 on the memory card. Although one storage interface 436 is shown in FIG. 4, the data interface components 430 include multiple storage interfaces. The storage interface 436 may be similar to the data interface 124 shown in FIG. 1B.

The spatial, or spatiotemporal, sensors 440 detect the spatial position, movement, or both, of the image capture apparatus 400. As shown in FIG. 4, the spatial sensors 440 include a position sensor 442, an accelerometer 444, and a gyroscope 446. The position sensor 442, which may be a global positioning system (GPS) sensor, may determine a geospatial position of the image capture apparatus 400, which may include obtaining, such as by receiving, temporal data, such as via a GPS signal. The accelerometer 444, which may be a three-axis accelerometer, may measure linear motion, linear acceleration, or both of the image capture apparatus 400. The gyroscope 446, which may be a three-axis gyroscope, may measure rotational motion, such as a rate of rotation, of the image capture apparatus 400. In some implementations, the spatial sensors 440 may include other types of spatial sensors. In some implementations, one or more of the position sensor 442, the accelerometer 444, and the gyroscope 446 may be omitted or combined.

The power components 450 distribute electrical power to the components of the image capture apparatus 400 for operating the image capture apparatus 400. As shown in FIG. 4, the power components 450 include a battery interface 452, a battery 454, and an external power interface 456 (ext. interface). The battery interface 452 (bat. interface) operatively couples to the battery 454, such as via conductive contacts to transfer power from the battery 454 to the other electronic components of the image capture apparatus 400. The battery interface 452 may be similar to the battery receptacle 126 shown in FIG. 1B. The external power interface 456 obtains or receives power from an external source, such as a wall plug or external battery, and distributes the power to the components of the image capture apparatus 400, which may include distributing power to the battery 454 via the battery interface 452 to charge the battery 454. Although one battery interface 452, one battery 454, and one external power interface 456 are shown in FIG. 4, any number of battery interfaces, batteries, and external power interfaces may be used. In some implementations, one or more of the battery interface 452, the battery 454, and the external power interface 456 may be omitted or combined. For example, in some implementations, the external interface 456 and the I/O interface 432 may be combined.

The user interface components 460 receive input, such as user input, from a user of the image capture apparatus 400, output, such as display or present, information to a user, or both receive input and output information, such as in accordance with user interaction with the image capture apparatus 400.

As shown in FIG. 4, the user interface components 460 include visual output components 462 to visually communicate information, such as to present captured images. As shown, the visual output components 462 include an indicator 464 and a display 466. The indicator 464 may be similar to the indicator 106 shown in FIG. 1A or the indicators 208 shown in FIGS. 2A-2B. The display 466 may be similar to the display 108 shown in FIG. 1A, the display 142 shown in FIG. 1B, or the display 224 shown in FIG. 2B. Although the visual output components 462 are shown in FIG. 4 as including one indicator 464, the visual output components 462 may include multiple indicators. Although the visual output components 462 are shown in FIG. 4 as including one display 466, the visual output components 462 may include multiple displays. In some implementations, one or more of the indicators 464 or the display 466 may be omitted or combined.

As shown in FIG. 4, the user interface components 460 include a speaker 468. The speaker 468 may be similar to the speaker 138 shown in FIG. 1B or the audio components 218, 220, 222 shown in FIGS. 2A-2B. Although one speaker 468 is shown in FIG. 4, the user interface components 460 may include multiple speakers. In some implementations, the speaker 468 may be omitted or combined with another component of the image capture apparatus 400, such as the microphone 414.

As shown in FIG. 4, the user interface components 460 include a physical input interface 470. The physical input interface 470 may be similar to the mode buttons 110, 210 shown in FIGS. 1A, 2A or the shutter buttons 112, 212 shown in FIGS. 1A, 2B. Although one physical input interface 470 is shown in FIG. 4, the user interface components 460 may include multiple physical input interfaces. In some implementations, the physical input interface 470 may be omitted or combined with another component of the image capture apparatus 400. The physical input interface 470 may be, for example, a button, a toggle, a switch, a dial, or a slider.

As shown in FIG. 4, the user interface components 460 include a broken line border box labeled "other" to indicate that components of the image capture apparatus 400 other than the components expressly shown as included in the user interface components 460 may be user interface components. For example, the microphone 414 may receive, or capture, and process audio signals to obtain input data, such as user input data corresponding to voice commands. In another example, the image sensor 412 may receive, or capture, and process image data to obtain input data, such as user input data corresponding to visible gesture commands. In another example, one or more of the spatial sensors 440, such as a combination of the accelerometer 444 and the gyroscope 446, may receive, or capture, and process motion data to obtain input data, such as user input data corresponding to motion gesture commands.

With reference now to FIGS. 5 and 6, a (spherical) image capture apparatus 500 is illustrated. The image capture apparatus 500 includes components and features that are similar to the aforedescribed image capture apparatus 300 and, accordingly, will only be discussed with respect to differences therefrom in the interest of brevity. As such, identical reference characters will be utilized to refer to elements, structures, features, etc., common to the image capture apparatuses 300, 500. More specifically, FIG. 5 is an axial (longitudinal) cross-sectional view of the image capture apparatus 500, and FIG. 6 is an enlargement of the area of detail identified in FIG. 5.

In addition to the lenses 330, 332, which are supported by a body 302 of the image capture apparatus 300 so as to define the fields-of-view 340, 344, the image capture apparatus 500 includes a pair of (generally identical) optical accessories 502*i*, 502*ii* that are configured for removable connection to the image capture apparatus 500 (e.g., the body 302). More specifically, the optical accessories 502*i*, 502*ii* include housings 504*i*, 504*ii* and lenses 506*i*, 506*ii* that are supported by the housings 504*i*, 504*ii* such that, upon connection of the optical accessories 502*i*, 502*ii* to the image capture apparatus 500, the optical accessories 502*i*, 502*ii* (e.g., the lenses 506*i*, 506*ii*) overlie the lenses 330, 332, respectively.

It is envisioned that the optical accessories 502*i*, 502*ii* may be configured in any manner suitable for the intended purpose of repeatedly connecting the optical accessories 502*i*, 502*ii* to and disconnecting the optical accessories 502*i*, 502*ii* from the image capture apparatus 500. For example, it is envisioned that the optical accessories 502*i*, 502*ii* may be threadably or rotatably connected to the image capture apparatus 500, that the optical accessories 502*i*, 502*ii* may be configured for engagement with the image capture apparatus 500 in a snap (press) fit, etc.

In the illustrated embodiment, the optical accessories 502*i*, 502*ii* are configured to interface with mounting structures 508*i*, 508*ii* (e.g., bayonets 510*i*, 510*ii*), which are secured (connected) to, or otherwise supported by, the body 302 of the image capture apparatus 500. Although shown as configured for direct connection to the mounting structures 508*i*, 508*ii*, embodiments in which the optical accessories 502*i*, 502*ii* may be configured for indirect connection to the mounting structures 508*i*, 508*ii* are also envisioned herein. For example, it is envisioned that adapters may be provided that are configured for connection to the mounting structures 508*i*, 508*ii* and the optical accessories 502*i*, 502*ii* such that the adapters are located between and indirectly connect the mounting structures 508*i*, 508*ii* and the optical accessories 502*i*, 502*ii*, respectively. In such embodiments, it is envisioned that the adapters may also be configured to interface with a variety of accessories (products), in addition to the optical accessories 502*i*, 502*ii*, to facilitate connection of the accessories and/or products to the image capture apparatus 500 and disconnection of the accessories (products) from the image capture apparatus 500.

Figure 7:
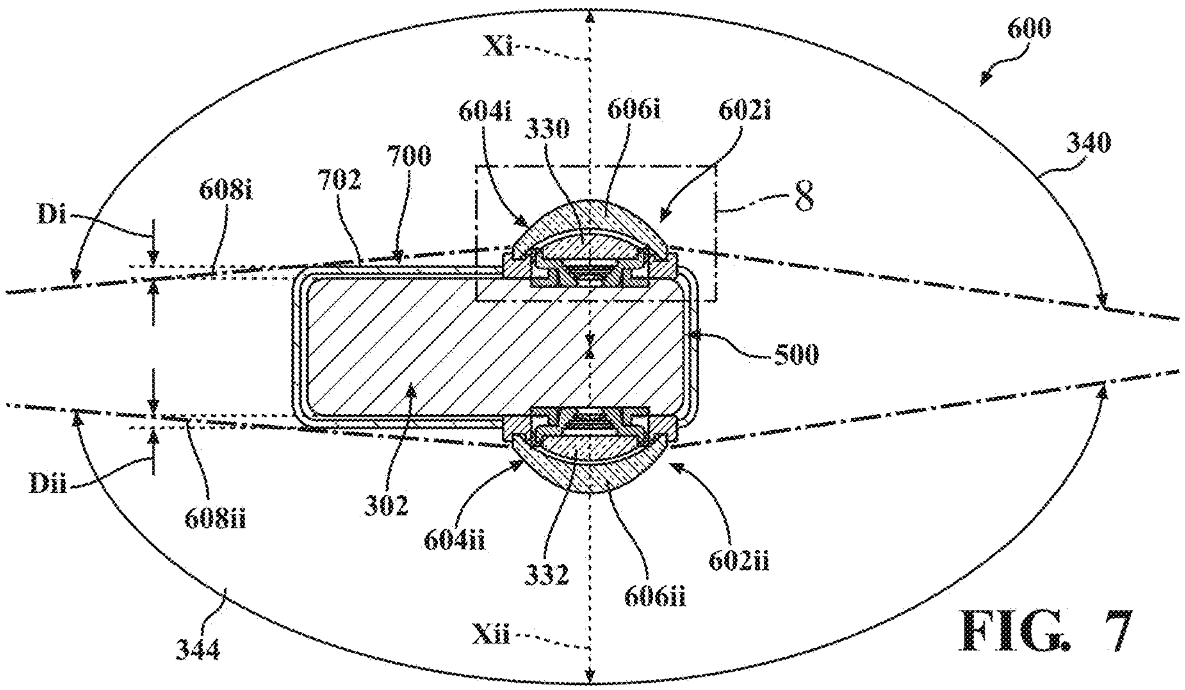
FIG. 7 is an axial (longitudinal) cross-sectional view of an example of an image capture system that includes: the image capture apparatus seen in FIG. 5; alternate embodiments of the optical accessories seen in FIG. 5; and a housing.
Figure 8:
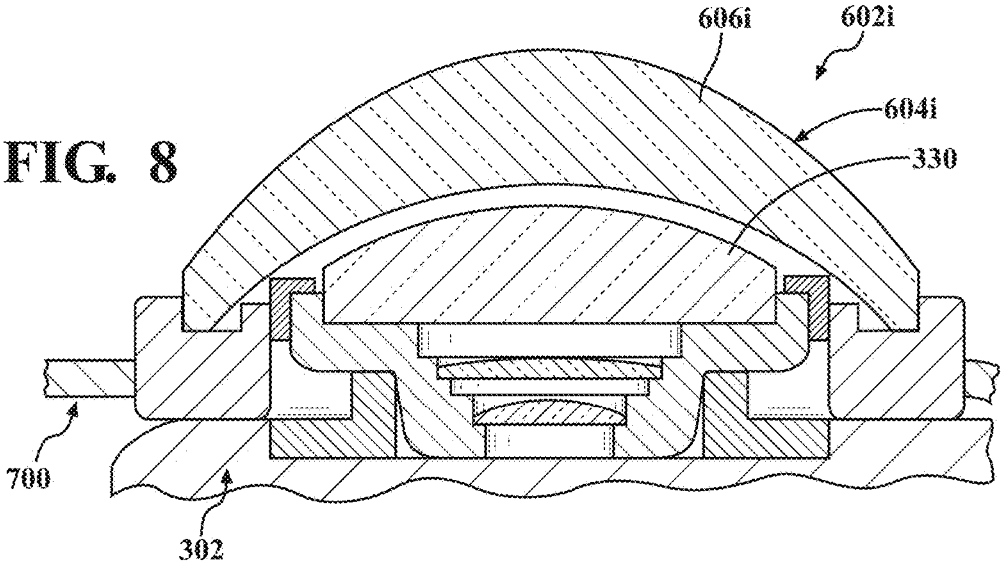
FIG. 8 is an enlargement of the area of detail identified in FIG. 7.

Referring now to FIGS. 7 and 8, an image capture system 600 is illustrated that includes: the image capture apparatus 500 (FIGS. 5, 6); optical accessories 602*i*, 602*ii*, which are alternate embodiments of the optical accessories 502*i*, 502*ii*; and a housing 700. More specifically, FIG. 7 is an axial (longitudinal) cross-sectional view of the image capture system 600, and FIG. 8 is an enlargement of the area of detail identified in FIG. 7. The optical accessories 602*i*, 602*ii*, include components and features that are similar to the aforedescribed optical accessories 502*i*, 502*ii* (FIGS. 5, 6) and, accordingly, will only be discussed with respect to differences therefrom in the interest of brevity. As such, identical reference characters will be utilized to refer to elements, structures, features, etc., common to the optical accessories 502, 602.

As discussed above in connection with the optical accessories 502*i*, 502*ii*, the optical accessories 602*i*, 602*ii* are configured for removable connection to the image capture apparatus 500 (e.g., the body 302) such that the optical accessories 602*i*, 602*ii* respectively overlie the lenses 330, 332. In contrast to the optical accessories 502*i*, 502*ii*, however, the optical accessories 602*i*, 602*ii* include optical groups 604*i*, 604*ii* with at least one lens 606*i*, 606*ii*, respectively. Although the optical groups 604*i*, 604*ii* are shown as including single lenses 606*i*, 606*ii* in FIGS. 7 and 8, embodiments in which the optical groups 604*i*, 604*ii* may include a plurality of lenses 606*i*, 606*ii* (e.g., two lenses 606*i*, 606*ii*, three lenses 606*i*, 606*ii*, etc.), respectively, are also envisioned herein and would not be beyond the scope of the present disclosure.

The optical groups 604*i*, 604*ii* are configured to shift the fields-of-view 340, 344 outwardly (e.g., away from the image capture apparatus 500 along the optical axes Xi, Xii) such that the fields-of-view 340, 344 are spaced from the body 302 by (axial) distances Di, Dii so as to define blind areas 608*i*, 608*ii*, which are located between the fields-of-view 340, 344 and the body 302 of the image capture apparatus 500, respectively. The blind areas 608*i*, 608*ii* are configured to receive the housing 700 such that, upon assembly of the image capture system 600, the housing 700 is located outside of the fields-of-view 340, 344, which inhibits (if not entirely prevents) inclusion of the housing 700 within the (spherical) image generated by the image capture apparatus 500. More specifically, the receipt of the housing 700 within the blind areas 608*i*, 608*ii* inhibits (if not entirely prevents) detection of the housing 700 and the blind areas 608*i*, 608*ii* by the image sensors 342, 346 (FIG. 3) when the image capture apparatus 500 is positioned within the housing 700. Stated another way, the housing 700 is located within the blind areas 608*i*, 608*ii* that are created when the fields-of-view 340, 344 are shifted by use of the optical accessories 602*i*, 602*ii* with the image capture apparatus 500.

In the illustrated embodiment, the optical groups 604*i*, 604*ii* are configured such that the distances Di, Dii are predetermined and lie (substantially) within the range of (approximately) ½ mm to (approximately) 5 mm. Embodiments in which the optical groups 604*i*, 604*ii* may be configured such that the distances Di, Dii lie outside of the disclosed range (e.g., depending upon the particular configuration of the housing 700), however, are also envisioned herein and would not be beyond the scope of the present disclosure.

Figure 9:
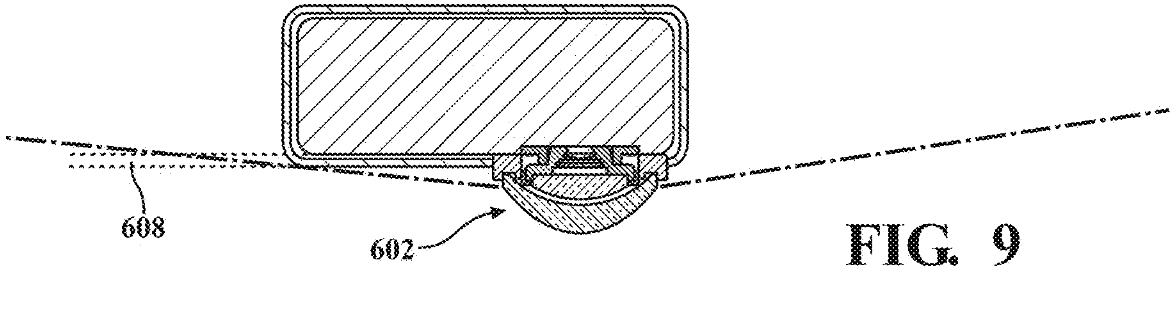
FIG. 9 is an axial (longitudinal) cross-sectional view of another example of an image capture apparatus shown with one of the optical accessories seen in FIG. 7.

Although illustrated in connection with the (spherical) image capture apparatus 500, embodiments are also envisioned herein that contemplate use of the optical accessory 602 in non-spherical image capture. For example, FIG. 9 is an axial (longitudinal) cross-sectional view of a non-spherical image capture apparatus (e.g., the image capture apparatus 100 (FIGS. 1A, 1B)), which is shown with a (single) optical accessory 602 that defines a (single) blind area 608. As such, the present disclosure envisions image capture systems 600 including at least one optical accessory 602 that is configured to overlie at least one lens (e.g., the first lens 330 and/or the second lens 332) on the image capture apparatus 500 so as to define at least one blind area 608.

The housing 700 is configured to receive the image capture apparatus 500 in order to protect the image capture apparatus 500 during use, and may include any material or combination of materials suitable for that intended purpose. For example, in certain embodiments, it is envisioned that the housing 700 may include a (generally) rigid construction, whereas in other embodiments, it is envisioned that the housing 700 may include a (generally) non-rigid (e.g., pliable, elastomeric) construction.

In the illustrated embodiment, the housing 700 is configured as a sleeve 702 that is intended for use in a land environment. To support such use, the optical accessories 602*i*, 602*ii* include a first optical prescription (e.g., first optical properties) and are configured for use in an environment defining an index of refraction that lies (substantially) within the range of (approximately) 1.0 to (approximately) 1.1 (e.g., a land environment). Embodiments are also envisioned in which the optical accessories 602*i*, 602*ii* may include a second, different optical prescription (e.g., second optical properties), however. For example, it is envisioned that the optical accessories 602*i*, 602*ii* may be configured for use in an environment defining an index of refraction that lies (substantially) within the range of (approximately) 1.3 to (approximately) 1.5 (e.g., in order to facilitate the use of the image capture apparatus 500 in an underwater environment, as described in further detail below).

With reference now to FIGS. 5-8, use of the image capture system 600 will be discussed. Prior to insertion of the image capture apparatus 500 into the housing 700, the optical accessories 502*i*, 502*ii* (FIGS. 5, 6) may be utilized during image capture. In order to facilitate the use of the image capture apparatus 500 with the housing 700 (FIG. 7), however, either prior or subsequent to insertion of the image capture apparatus 500 into the housing 700, the optical accessories 502*i*, 502*ii* can be removed (e.g., via disconnection from the mounting structures 508*i*, 508*ii*) and replaced with the optical accessories 602*i*, 602*ii* (FIGS. 7, 8) (e.g., via connection to the mounting structures 508*i*, 508*ii*), respectively. As discussed above, connection of the optical accessories 602*i*, 602*ii* shifts the fields-of-view 340, 344 outwardly such that the housing 700 (e.g., the sleeve 702) is located within the blind areas 608*i*, 608*ii* and outside of the fields-of-view 340, 344, respectively.

Figure 10A:
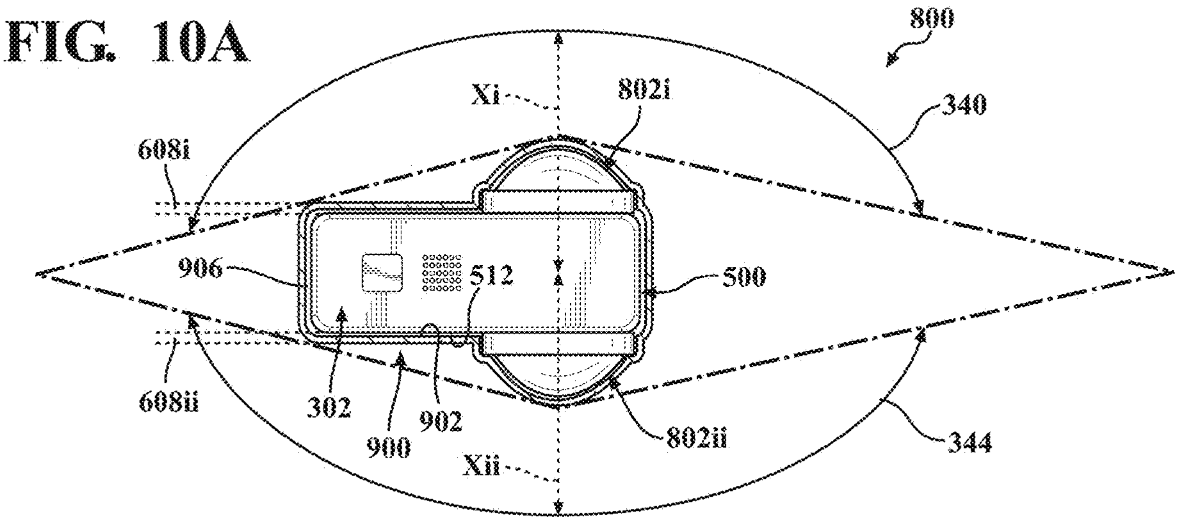
FIG. 10A is a side, plan view of another example of an image capture system that includes: the image capture apparatus seen in FIG. 5; alternate embodiments of the optical accessories seen in FIG. 7; and an underwater housing.

Referring now to FIG. 10A, an image capture system 800 is illustrated, which is an alternate embodiment of the image capture system 600. The image capture system 800 includes components and features that are similar to the aforedescribed image capture system 600 (FIGS. 7, 8) and, accordingly, will only be discussed with respect to differences therefrom in the interest of brevity. As such, identical reference characters will be utilized to refer to elements, structures, features, etc., common to the image capture systems 600, 800. More specifically, FIG. 10A is a side, plan view of the image capture system 800.

The image capture system 800 is configured for use in an underwater environment and includes: the image capture apparatus 500 (FIGS. 5, 6); optical accessories 802*i*, 802*ii*, which are alternate embodiments of the optical accessories 602*i*, 602*ii*; and an underwater housing 900 that is configured to receive the image capture apparatus 500.

Whereas the optical accessories 602*i*, 602*ii* (FIGS. 7, 8) include (first) optical properties, the optical accessories 802*i*, 802*ii* include (second), different optical properties. More specifically, in addition to shifting the fields-of-view 340, 344 outwardly (e.g., away from the image capture apparatus 500 along the optical axes Xi, Xii) such that the fields-of-view 340, 344 are spaced from the body 302, respectively, the optical accessories 802*i*, 802*ii* are each configured for use in an environment defining an index of refraction that lies (substantially) within the range of (approximately) 1.3 to (approximately) 1.5, which facilitates use of the image capture apparatus 500 in the underwater environment. As discussed above, the outward shift in the fields-of-view 340, 344 allows the underwater housing 900 to be located within the blind areas 608*i*, 608*ii*, thereby inhibiting (if not entirely preventing) detection of the underwater housing 900 and the blind areas 608*i*, 608*ii* by the image sensors 342, 346 (FIG. 3) when the image capture apparatus 500 is positioned within the underwater housing 900, respectively, and, thus, inclusion of the underwater housing 900 within the (spherical) image generated by the image capture apparatus 500, as discussed above. The outward shift in the fields-of-view 340, 344 facilitated by the optical accessories 802*i*, 802*ii* also allows for a reduction in the overall form factor (e.g., the size) of the underwater housing 900, which improves the quality of the images captured during use of the image capture system 800. More specifically, as seen in FIG. 10A, the underwater housing 900 defines an inner contour (profile) 902 that (generally) approximates (e.g., mirrors) an outer contour (profile) 512 defined by the image capture apparatus 500, which inhibits (if not entirely prevents) the underwater housing 900 from obscuring, blocking, or otherwise interfering with image capture (e.g., the creation of blind spots).

Figure 10B:
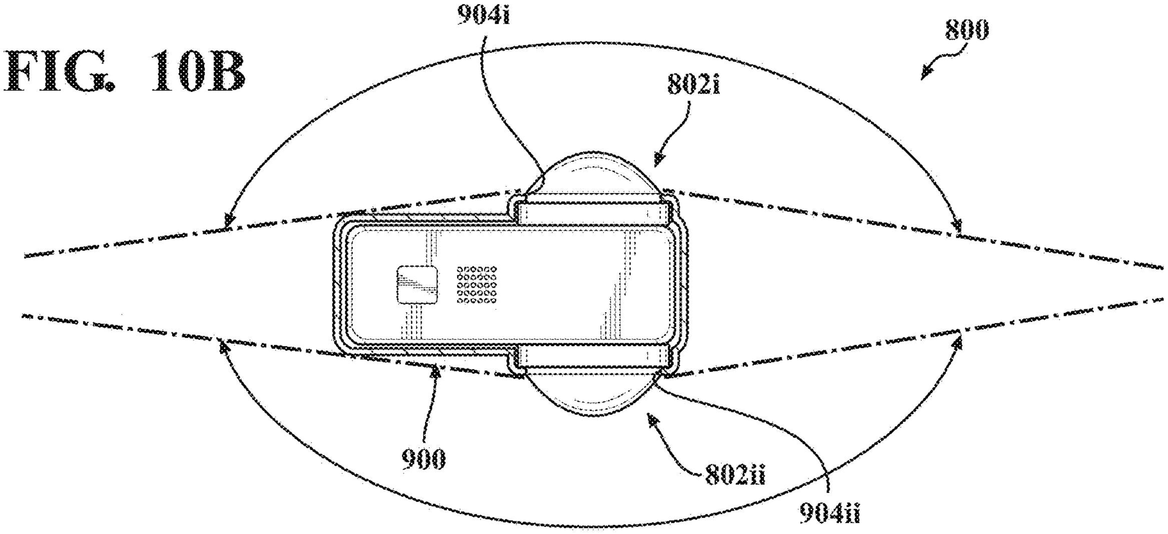
FIG. 10B is a side, plan view of an alternate embodiment of the underwater housing seen in FIG. 10A shown with the image capture apparatus and the optical accessories.

FIG. 10B is a side, plan view of an alternate embodiment of the underwater housing 900, which includes a pair of apertures 904*i*, 904*ii* that are configured to receive the optical accessories 802*i*, 802*ii* such that the optical accessories 802*i*, 802*ii* extend through the apertures 902*i*, 902*ii*, respectively, and protrude from the underwater housing 900. In certain embodiments, it is envisioned that that the housing 900 and the optical accessories 802*i*, 802*ii* may be configured for sealed engagement in order to inhibit (if not entirely prevent) the entry of water into the underwater housing 900. For example, it is envisioned that the image capture system 800 may include one or more sealing members (e.g., gaskets, O-rings, or the like) that are positioned between the housing 900 and the optical accessories 802*i*, 802*ii*, that the housing 900 and the optical accessories 802 may include corresponding engagement features (e.g., undercuts, flanges, etc.), or the like.

The underwater housing 900 defines a watertight internal chamber 906 that is configured to receive and protect the image capture apparatus 500 in the underwater environment, and may include any material or combination of materials suitable for that intended purpose. For example, in certain embodiments, it is envisioned that the underwater housing 900 may include one or more optically clear plastic or polymeric materials so as not to interfere with image capture by the image capture apparatus 500.

The underwater housing 900 is reconfigurable between open and closed configurations, which facilitates insertion of the image capture apparatus 500 into the internal chamber 906 and removal of the image capture apparatus 500 therefrom. It is envisioned that the underwater housing 900 may include any mechanism (or combination of mechanisms) suitable for the intended purpose of maintaining (e.g., locking) the underwater housing 900 in the closed configuration such as, for example, one or more latches, clamps, sliders, etc. Additionally, it is envisioned that the underwater housing 900 may include one or more sealing members (e.g., gaskets, O-rings, or the like) in order to establish and maintain a watertight environment for the image capture apparatus 500 when the underwater housing 900 is in the closed configuration.

In the illustrated embodiment, the optical accessories 802*i*, 802*ii* are shown as removably secured (connected) to the image capture apparatus 500 in the manner discussed above with respect to the optical accessories 502*i*, 502*ii* (FIGS. 5, 6), whereby the image capture apparatus 500 and the optical accessories 802*i*, 802*ii* are each positioned within the underwater housing 900 during use of the image capture system 800.

Figure 11:
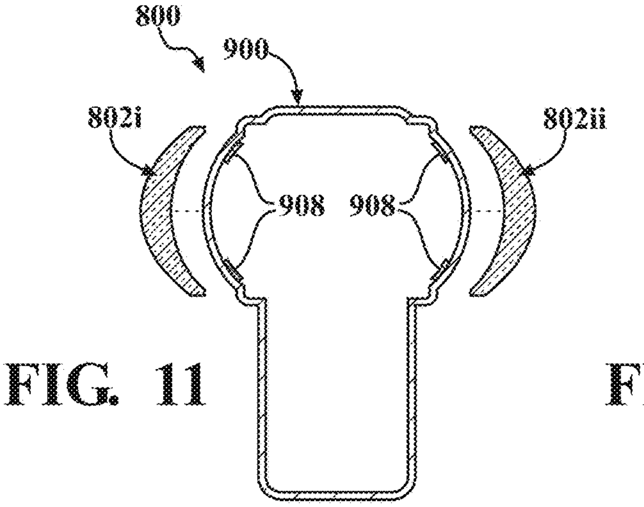
FIG. 11 is a partial, side, plan view of another example of an image capture system that includes the optical accessories and the underwater housing seen in FIG. 7 in which the optical accessories are located externally of the underwater housing.
Figure 12:
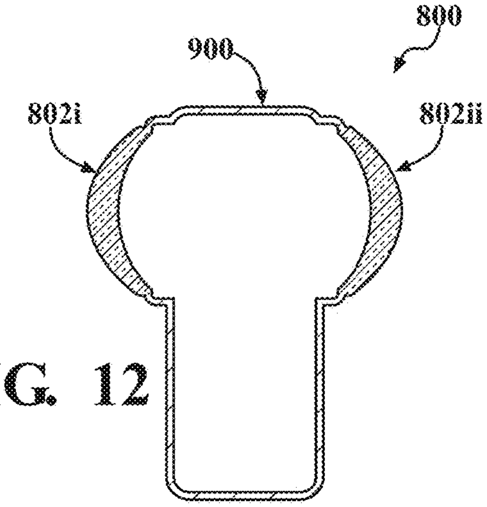
FIG. 12 is a partial, side, plan view of another example of an image capture system that includes the optical accessories and the underwater housing seen in FIG. 7 in which the optical accessories are formed integrally with the underwater housing.

FIG. 11, however, illustrates an alternate embodiment of the image capture system 800 in which the optical accessories 802*i*, 802*ii* are located externally of the underwater housing 900. More specifically, FIG. 11 is a side, plan view of the image capture system 800 (the image capture apparatus 500 is omitted for clarity). In the illustrated embodiment, the optical accessories 802*i*, 802*ii* are shown as configured for removable connection to the underwater housing 900. In order to establish and maintain the aforementioned watertight environment for the image capture apparatus 500, it is envisioned that the image capture system 800 may include one or more sealing members (e.g., gaskets, O-rings, or the like) that are located between the optical accessories 802*i*, 802*ii* and the underwater housing 900. Alternatively, however, it is envisioned that the optical accessories 802*i*, 802*ii* may be non-removably connected to the underwater housing 900, which may eliminate the need for any such sealing member(s). For example, FIG. 12 is a side, plan view of an alternate embodiment of the underwater housing 900 in which the optical accessories 802*i*, 802*ii* are formed integrally (e.g., unitarily, monolithically) with the underwater housing 900.

It is envisioned that the optical accessories 802*i*, 802*ii* and/or the underwater housing 900 may be configured to interface with image capture apparatus 500 in order to facilitate and maintain proper alignment between the image capture apparatus 500 and the optical accessories 802*i*, 802*ii*. For example, in one particular embodiment, it is envisioned that the optical accessories 802*i*, 802*ii* and the mounting structures 508*i*, 508*ii* (FIGS. 5, 6) may include corresponding alignment features (e.g., pins, slots, channels, detents, recesses, etc.) that are configured for (mechanical) engagement during assembly of the image capture system 800.

In certain embodiments, it is envisioned that the underwater housing 900 and/or the optical accessories 802*i*, 802*ii* may include one or more non-reflective sections 908 (FIG. 11) in order to inhibit (if not entirely prevent) stray light from being reflected, refracted, or otherwise directed into the image capture apparatus 500 (FIG. 10A) (e.g., off of the underwater housing 900) and thereby reduce (if not entirely eliminate) ghosting, flares, or other such defects in the generated image. For example, it is envisioned that the underwater housing 900 and/or the optical accessories 802*i*, 802*ii* may include an optically opaque paint or other such non-reflective coating, which may be located on inner and/or exterior surfaces of the underwater housing 900.

With reference again to FIG. 10A, use of the image capture system 800 will be discussed. Initially, the underwater housing 900 is moved from the closed configuration into the open configuration, and the optical accessories 502*i*, 502*ii* (FIGS. 5, 6) are removed from the image capture apparatus 500. Thereafter, the optical accessories 802*i*, 802*ii* are connected to the image capture apparatus 500 (e.g., to the respective mounting structures 508*i*, 508*ii*) in order to shifts the fields-of-view 340, 344 outwardly such that the underwater housing 900 is located within the blind areas 608*i*, 608*ii* in the manner discussed above. The image capture apparatus 500 and the optical accessories 802*i*, 802*ii* are then inserted into the internal chamber 906, and the underwater housing 900 is moved from the open configuration into the closed configuration.

Alternatively, following removal of the optical accessories 502*i*, 502*ii* (FIGS. 5, 6) from the image capture apparatus 500, the image capture apparatus 500 is inserted into the internal chamber 906, and the underwater housing 900 is moved from the open configuration into the closed configuration. Either prior or subsequent thereto, the optical accessories 802*i*, 802*ii* can be (removably) connected to the underwater housing 900.

Figure 13:
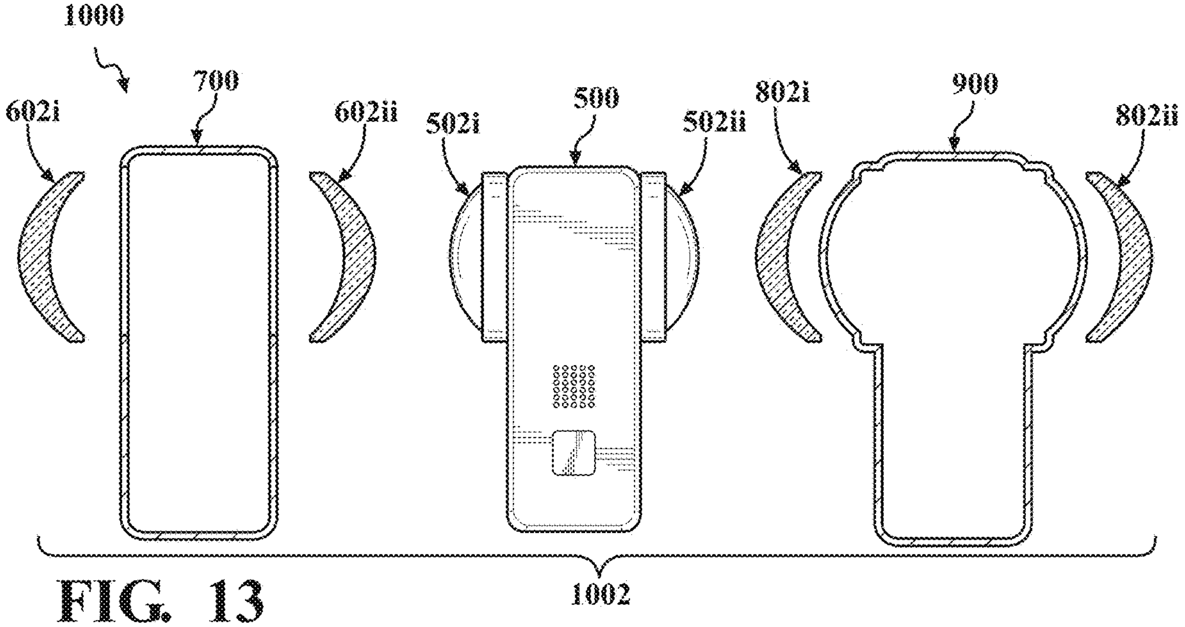
FIG. 13 is a side, plan view of another example of an image capture system that includes: the image capture apparatus and the optical accessories seen in FIG. 5; the housing and the optical accessories seen in FIG. 7; and the housing and the optical accessories seen in FIG. 10A.

With reference now to FIG. 13, an image capture system 1000 (e.g., a kit 1002) is illustrated, which facilitates use of the image capture apparatus 500 in both land and underwater environments. More specifically, FIG. 13 is a side, plan view of the image capture system 1000, which includes: the image capture apparatus 500 and the optical accessories 502*i*, 502*ii* (FIGS. 5, 6); the housing 700 (FIG. 7); the optical accessories 602*i*, 602*ii* (FIGS. 7, 8); the housing 900 (FIG. 10A, FIG. 10B, FIG. 11); and the optical accessories 802*i*, 802*ii* (FIG. 10A, FIG. 10B, FIG. 11). Although the image capture system 1000 is shown as including the image capture apparatus 500 and the optical accessories 502, 502*ii*, embodiments are also envisioned in which the image capture apparatus 500 and the optical accessories 502*i*, 502*ii* may be provided separately (e.g., such that the image capture system 1000 includes only the housings 700, 900 and the optical accessories 602*i*, 602*ii*, 802*i*, 802*ii*).

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of up to 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±10%, ±15%, ±25%). The term "generally parallel" should thus be understood as encompassing configurations in which the pertinent components are arranged in parallel relation. Similarly, the term "generally identical" should be understood as encompassing configurations in which the pertinent components are identical in configuration as well as configurations in which there may be insubstantial variations between the pertinent components that do not influence the substantive construction or performance thereof.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure, etc.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture system comprising:

an image capture apparatus including:

a body; and at least one lens supported by the body, wherein the at least one lens defines a first field-of-view; and at least one optical accessory configured to overlie the at least one lens, wherein the at least one optical accessory defines a second field-of-view that is spaced outwardly from the first field-of-view away from the body of the image capture apparatus by a predetermined distance that lies within a range of approximately ½ mm to approximately 5 mm so as to define at least one blind.

2. The image capture system of claim 1, wherein the at least one optical accessory includes a single lens.

3. The image capture system of claim 1, wherein the image capture apparatus further includes a mounting structure connected to the body.

4. The image capture system of claim 3, wherein the at least one optical accessory is configured for direct connection to the mounting structure.

5. The image capture system of claim 1, wherein the at least one optical accessory is configured for use in an environment defining an index of refraction that lies substantially within a range of approximately 1.0 to approximately 1.1.

6. The image capture system of claim 5, further comprising a sleeve configured to receive the image capture apparatus such that the sleeve is located within the at least one blind area.

7. The image capture system of claim 1, wherein the at least one optical accessory is configured for use in an environment defining an index of refraction that lies substantially within a range of approximately 1.3 to approximately 1.5.

8. The image capture system of claim 7, further comprising an underwater housing configured to receive the image capture apparatus such that the underwater housing is located within the at least one blind area.

9. The image capture system of claim 8, wherein the at least one optical accessory is configured for removable connection to the underwater housing.

10. The image capture system of claim 8, wherein the at least one optical accessory is formed integrally with the underwater housing such that the underwater housing and the at least one optical accessory are non-removably connected.

11. An image capture system comprising:

an image capture apparatus including:

a body; and at least one lens supported by the body, wherein the at least one lens defines a first field-of-view;

at least one first optical accessory including first optical properties; and at least one second optical accessory including second optical properties different than the first optical properties, wherein the at least one first optical accessory and the at least one second optical accessory are each configured to overlie the at least one lens and each define a second field-of-view that is spaced outwardly from the first field-of-view away from the body of the image capture apparatus by a predetermined distance that lies within a range of approximately ½ mm to approximately 5 mm.

12. The image capture system of claim 11, wherein the at least one first optical accessory is configured for use in an environment defining an index of refraction that lies substantially within a range of approximately 1.0 to approximately 1.1.

13. The image capture system of claim 12, further comprising a sleeve configured to receive the image capture apparatus such that the sleeve is located outside of the second field-of-view.

14. The image capture system of claim 11, wherein the at least one second optical accessory is configured for use in an environment defining an index of refraction that lies substantially within a range of approximately 1.3 to approximately 1.5.

15. The image capture system of claim 14, further comprising an underwater housing configured to receive the image capture apparatus such that the underwater housing is located outside of the second field-of-view.

16. An underwater image capture system for use with an image capture apparatus defining an optical axis and a first field-of-view, the underwater image capture system comprising:

an underwater housing configured to receive the image capture apparatus; and at least one optical accessory defining a second field-of-view spaced outwardly from the first field-of-view along the optical axis by a predetermined distance that lies within a range of approximately ½ mm to approximately 5 mm so as to define at least one blind area configured to receive the underwater housing so as to inhibit detection of the at least one blind area and the underwater housing by at least one image sensor of the image capture apparatus when the image capture apparatus is positioned within the underwater housing.

17. The underwater image capture system of claim 16, wherein the at least one optical accessory is configured for use in an environment defining an index of refraction that lies within a range of approximately 1.3 to approximately 1.5.

18. The underwater image capture system of claim 16, wherein the at least one optical accessory is formed integrally with the underwater housing such that the at least one optical accessory and the underwater housing are non-removably connected.

19. The underwater image capture system of claim 16, wherein the at least one optical accessory is configured for removable connection to the underwater housing.

20. The underwater image capture system of claim 16, wherein the underwater housing includes a non-reflective section to inhibit stray light from entering the image capture apparatus.

* * * * *